J. LAMONT.
Fruit Crusher.
No. 229,425.                    Patented June 29, 1880.
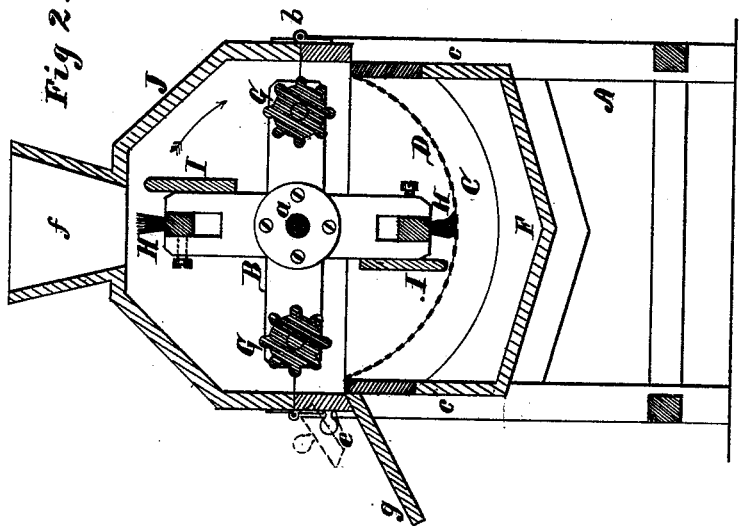
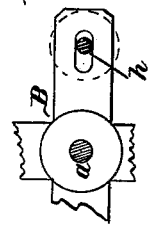
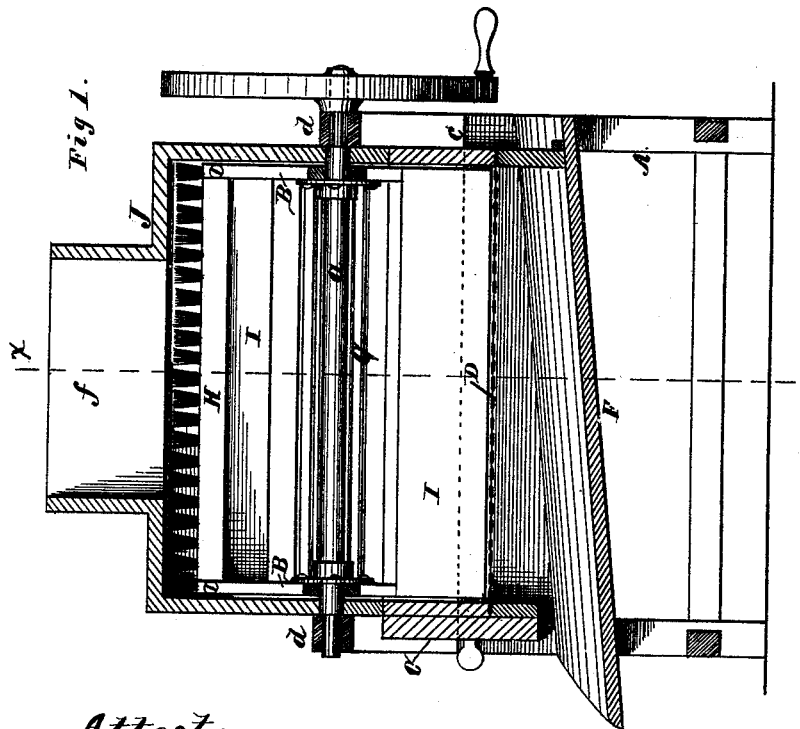
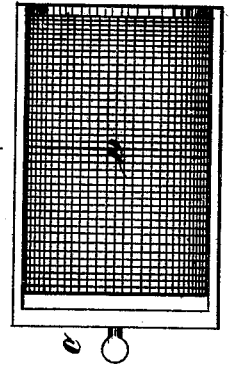
Attest:
M. A. Brooker
John Mitchell
Inventor:
John Lamont per
Frank H. Clement
Atty.

UNITED STATES PATENT OFFICE.

JOHN LAMONT, OF ROCHESTER, NEW YORK, ASSIGNOR OF ONE-HALF OF HIS RIGHT TO ALEXANDER LAMONT, OF SAME PLACE.

FRUIT-CRUSHER.

SPECIFICATION forming part of Letters Patent No. 229,425, dated June 29, 1880.

Application filed October 11, 1879.

*To all whom it may concern:*

Be it known that I, JOHN LAMONT, of Rochester, in the county of Monroe and State of New York, have invented a new and useful Improvement in Machines for Separating Seeds from Fruit-Pulp; and I hereby declare the following to be a clear and accurate description thereof, reference being had to the accompanying drawings, in which—

Figure 1 is a vertical longitudinal section of my machine. Fig. 2 is a transverse vertical section, showing those parts to the left of the dotted line $x$, Fig. 1. Figs. 3 and 4 show details.

My invention has for its object the separation of the seeds from the pulp of soft fruits and vegetables, such as tomatoes, grapes, melons, &c.; and it consists mainly in the employment of a screen or sieve in connection with a crushing device and a brush or wiper moving over the surface of the screen, whereby the pulp is crushed and forced through the meshes of the latter, while the seeds and skins are retained, being perfectly freed from the pulp by the action of the brushes.

A, Figs. 1 and 2, is a frame made of any desired material, and in such a form as to support the rotating spiders B, which are secured to a shaft, $a$, extending through the machine lengthwise, and having suitable bearings at $d$ on said frame.

C, Figs. 1, 2, and 3, is a drawer sliding into the frame A, under and parallel with the shaft $a$, on ways $c$, Fig. 2, and provided with a screen, D, bent to the arc of a circle corresponding with the outer circumference of the spiders B and their attachments. The screen is thus readily detachable from the machine for the purpose of cleaning or replacing it with another of different mesh.

Below the drawer C, which is bottomless otherwise than is due to the screen, I place a double incline or shallow trough, F, to receive the pulp that passes through the screen D and conduct it away to a suitable receptacle.

G represents rollers working in slotted bearings $h$, Fig. 4, in the arms of the spiders B, by reason of which they are free to drop nearly or quite to the surface of the screen D as the shaft $a$ is revolved. There may be one or more of these rollers, and I prefer to flute them, as shown in Fig. 2, in order that they may act to better advantage in crushing the pulp and forcing it through the screen.

H represents brushes secured to alternate arms of the spiders B, and made radially adjustable therein, so as to compensate for the wear of the bristles, the ends of which rub along the surface of the screen, as shown in Fig. 2.

I represents scrapers, preferably secured to the same arms of the spiders as the brushes, and arranged to move at a little distance from the surface of the screen. They preferably precede the brushes in the direction of rotation, as indicated in Fig. 2.

J is a cover hinged to the frame A at $b$, and made sufficiently tight to prevent leakage of pulp or juice when the machine is in operation. It is provided with a hopper, $f$, for the reception of the material to be separated. Thus the cover J and drawer C form a barrel-like case, out of which the contents cannot pass, except through the screen D or when purposely emptied. A door, $e$, is provided at the upper edge of the screen D, which is hinged or otherwise suitably secured to the cover J, and is fitted to close tightly to prevent the escape of pulp. An incline, $g$, is placed at the lower line of the door to conduct away the contents of the barrel after the pulp is removed.

The operation of my device is as follows: The material to be separated is introduced into the hopper $f$ in as large a charge as can be readily worked. The shaft $a$ is then revolved by hand or power, whereupon the rollers G, by their gravity, operate to crush the pulp, and to a certain extent force it through the screen. The scrapers I, following immediately after, lift the imperfectly-crushed material and carry it up over the shaft, from whence it falls upon the screen again, thoroughly stirred, just in advance of the roller, which renews the crushing operation at the next revolution. The scrapers leave a portion of the reduced pulp, seeds, and skins lying upon the surface of the screen, and upon this mass the brushes operate, forcing the pulp through the meshes, wiping the seeds and skins perfectly clean, and carrying more or less of the unseparated material over the shaft to be operated upon again and again. In a short time the pulp will have all passed through the screen and will have been conducted away by the trough F, and the seeds and skins will have been wiped perfectly clean, the seeds being ready for drying and packing and the pulp reduced to an even consistency suitable for canning, cooking, or other use. The door $e$ is then lifted, and, by a partial revolution of the shaft $a$, the remaining contents of the barrel are lifted up and dropped down the incline $g$. The skins, if any, and the seeds are then readily separated.

My invention is principally valuable to seedsmen and fruit-preservers, and is mainly used upon tomatoes, melons, and grapes.

Heretofore seedsmen have been obliged to grind or crush tomatoes, &c., ferment the pulp, and wash it to separate the seeds. The pulp was thus entirely lost. By means of my invention the seeds are thoroughly cleaned and the pulp is saved for wine or catchup or other use.

What I claim as my invention is—

1. The combination of the spiders B, revolving in a vertical plane, a concave screen or sieve under the same, the self-adjusting crushing roller or rollers G, brushes H, and scrapers I, arranged to operate substantially as set forth.

2. In combination with the concave screen D, scrapers I, and semi-cylindrical cover J, the door $e$ and incline $g$, for the purposes set forth.

3. In combination with the revolving screening mechanism B G H, the removable concave drawer C, to which the screen D is attached, substantially as and for the purposes set forth.

4. The combination of the screen D, the revolving mechanism B G H, and the trough F, arranged to operate substantially as set forth.

5. The combination of the moving crushing-rollers G, brushes H, revolving spiders B, screen D, drawer C, cover J, and emptying-door $e$, all arranged and operating substantially as described.

JOHN LAMONT.

Witnesses:
F. H. CLEMENT,
A. S. CLACKNER.